No. 639,205. Patented Dec. 12, 1899.
G. DURNERIN.
BEARING.
(Application filed May 11, 1898.)
(No Model.)
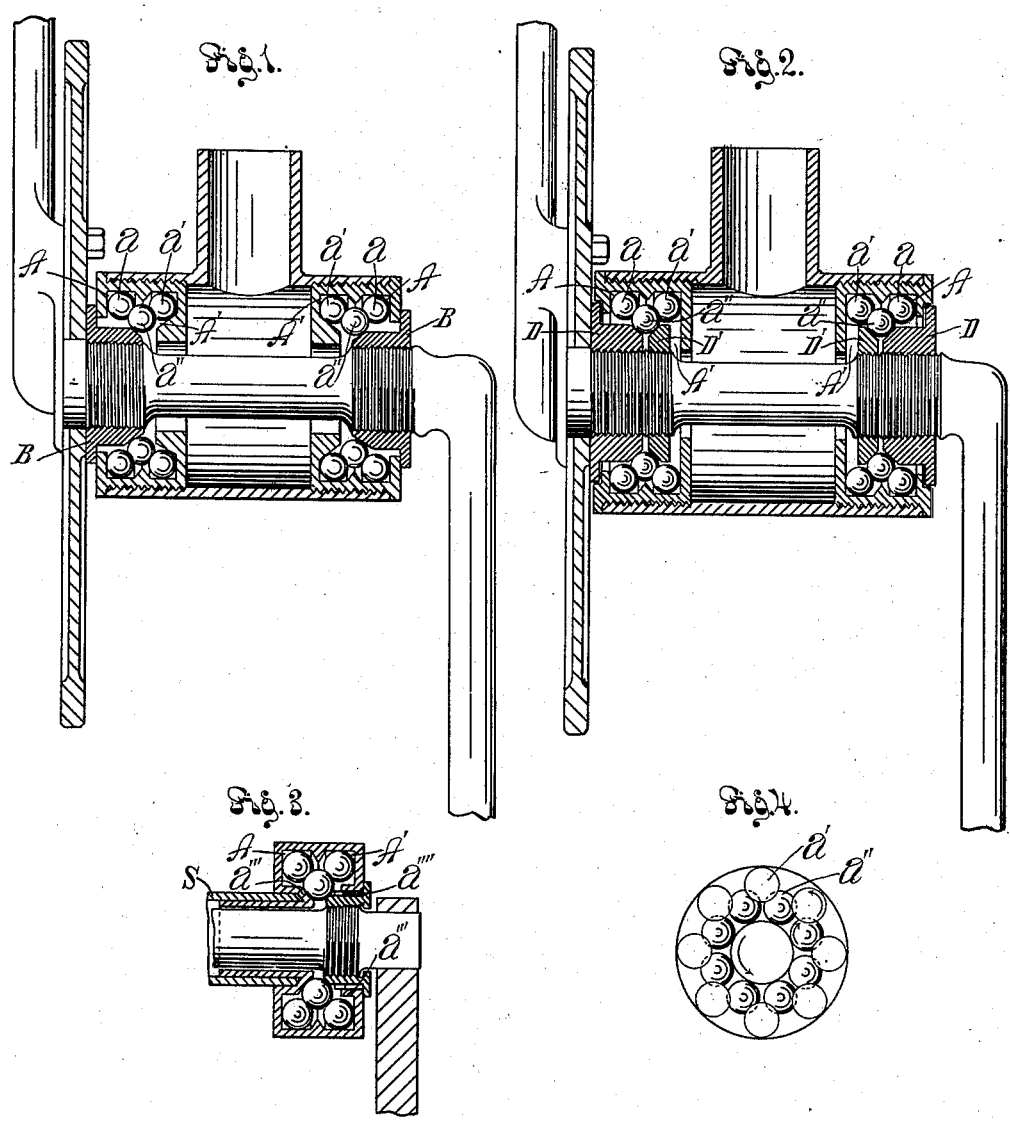

UNITED STATES PATENT OFFICE.

GABRIEL DURNERIN, OF LOS ANGELES, CALIFORNIA.

BEARING.

SPECIFICATION forming part of Letters Patent No. 639,205, dated December 12, 1899.

Application filed May 11, 1898. Serial No. 680,402. (No model.)

*To all whom it may concern:*

Be it known that I, GABRIEL DURNERIN, a citizen of the United States, residing at Los Angeles, in the county of Los Angeles and State of California, have invented new and useful Improvements in Bearings, of which the following is a specification.

My invention relates particularly to antifriction-bearings, such as ball-bearings, roller-bearings for bicycles, all kinds of vehicles, and for heavy journals for all kinds of machinery.

The particular object of my invention is to provide a bearing of this character in which there will be no rubbing of the balls or rollers against each other, the contacting faces always traveling toward and rolling upon each other, so that the bearing will be practically devoid of friction—that is to say, in roller or ball bearings in which the balls or rollers are arranged in a single row or layer encircling the spindle or axle which they journal the balls contact with each other and the contacting faces travel in opposite directions, so that they rub against each other and produce friction. This is more noticeable when weight is applied to the bearing than when the bearings are free from weight.

My invention comprises an annular raceway to receive the balls or rollers, a series of balls or bearings arranged in the raceway to contact therewith, and a second series of balls or rollers arranged inside the first series, contacting with, supported by, and separating such rollers or balls from each other, such outer series of balls or rollers in turn separating the inner series of bearings from each other, and a spindle or shaft arranged inside the second series and contacting therewith.

The accompanying drawings illustrate my invention.

Figure 1 is a fragmental sectional view illustrating one form of my improved bearing applied to a bicycle crank-hanger. Fig. 2 is a like view showing another form of bearing applied to a crank-hanger. Fig. 3 is a fragmental section of a detachable bearing. Fig. 4 is an elevation to show the relative arrangement of the balls as viewed from the end of the bearing.

In the drawings I have shown a bearing comprising two outer raceways A A', provided with two series of balls $a$ $a'$. A third series of balls $a''$ is arranged inside the two series and between the various balls of the two outer series, so as to effectually separate them from each other. Each inner ball is thus supported by four balls.

B represents the cones, which are secured upon the shaft in the ordinary manner and are arranged to tighten the bearing to any degree desired.

In Fig. 2 the cones D D' are shown made in two parts to permit accurate adjustment of the balls with relation to each other.

In Fig. 3 the two outer raceways A A' have their outer walls $a'''$ projecting inwardly to partially chamber the balls in the raceway, and a removable ring $a''''$, which fits tightly inside the bore, engages with the inner series of balls to retain them in their seats, they in turn holding the two outer series in place. The bearing is made to slip into the crank-hanger or journal-seat S and may be removed therefrom and cleaned without the balls dropping out of the raceways.

In Fig. 4 arrows indicate the direction of travel of the various parts, and it will be seen that the revolving faces which are in contact with each other all travel in the same direction, so that there is no binding or rubbing against each other. Therefore the bearing may be made as tight as need be without any liability of causing it to run heavy.

From the foregoing it will be seen that the outer series of bearings will contact with the raceway at a plurality of points in a line parallel with the axle, while the inner series contact with the outer series intermediate said points, and the circular plane of the outer peripheries of the inner series of bearings, or the points of said inner bearings farthest from the axle, lie beyond the inner and within the outer circular plane of the outer series of bearings.

Now, having described my invention, what I claim as new, and desire to secure by Letters Patent, is—

1. In a ball-bearing, the combination set forth of the journal-seat; the removable bearing adapted to fit within the journal-seat and provided with two independent raceways, the outside wall of each raceway projecting inwardly to partially chamber the balls within such raceway; two outer series of balls one arranged within each raceway; a third inner series of balls arranged between the two outer series, separating the balls of each outer series from each other and in turn being supported by and separated from each other by the balls of each outer series; and suitable means for adjustably holding the inner series of balls in position.

2. In a bearing, the combination set forth of the outer raceway; two series of balls arranged in such outer raceway; an inner series of balls arranged between the two series of balls, supported by and separating them from each other and in turn being separated from each other by the outer series, the circular plane of the outer peripheries of the inner series of balls lying beyond the inner and within the outer circular plane of the outer series of balls; and a spindle or shaft in contact with the inner series of balls.

GABRIEL DURNERIN.

Witnesses:
ALFRED I. TOWNSEND,
JAMES R. TOWNSEND.